United States Patent
Song et al.

(10) Patent No.: US 10,784,047 B2
(45) Date of Patent: Sep. 22, 2020

(54) MULTILAYER CERAMIC ELECTRONIC COMPONENT

(71) Applicant: SAMSUNG ELECTRO-MECHANICS CO., LTD., Suwon-si, Gyeonggi-do (KR)

(72) Inventors: Seung Woo Song, Suwon-si (KR); Min Gon Lee, Suwon-si (KR); Sang Soo Park, Suwon-si (KR); Jin Man Jung, Suwon-si (KR); Woo Chul Shin, Suwon-si (KR); Jin Kyung Joo, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/198,473

(22) Filed: Nov. 21, 2018

(65) Prior Publication Data

US 2020/0105472 A1 Apr. 2, 2020

(30) Foreign Application Priority Data

Oct. 2, 2018 (KR) ........................ 10-2018-0117771

(51) Int. Cl.
*H01G 4/232* (2006.01)
*H01G 4/236* (2006.01)
(Continued)

(52) U.S. Cl.
CPC ........... *H01G 4/2325* (2013.01); *H01G 4/236* (2013.01); *H01G 4/30* (2013.01); *H01G 4/008* (2013.01); *H01G 4/1227* (2013.01)

(58) Field of Classification Search
CPC ........... H01G 4/228; H01G 4/30; H01G 4/232
See application file for complete search history.

(56) References Cited

U.S. PATENT DOCUMENTS

| 4,701,827 | A | * | 10/1987 | Fujikawa | ............. | H01G 4/2325 |
| | | | | | | 361/309 |
| 2006/0193103 | A1 | * | 8/2006 | Yoshii | ................... | H01G 4/008 |
| | | | | | | 361/306.3 |

(Continued)

FOREIGN PATENT DOCUMENTS

| JP | 2000100647 A | * | 4/2000 |
| JP | 2002-203734 A | | 7/2002 |

(Continued)

OTHER PUBLICATIONS

Korean Office Action dated Sep. 11, 2019 issued in Korean Patent Application No. 10-2018-0117771 (with English translation).

*Primary Examiner* — Eric W Thomas
(74) *Attorney, Agent, or Firm* — Morgan, Lewis & Bockius LLP

(57) ABSTRACT

A multilayer ceramic electronic component includes a ceramic body including a dielectric layer, and a first internal electrode and a second internal electrode facing each other with the dielectric layer interposed therebetween, and a first external electrode electrically connected to the first internal electrode, and a second external electrode electrically connected to the second internal electrode, disposed in an outer portion of the ceramic body, the first and second external electrodes comprise a first electrode layer including a conductive metal, a first plating layer disposed on the first electrode layer and including nickel (Ni), and a second plating layer disposed on the first plating layer and including tin (Sn), and a ratio (t1/t2) is within a range from 1.0 to 9.0, where t1 is a thickness of the first plating layer including nickel (Ni), and t2 is a thickness of the second plating layer including tin (Sn).

17 Claims, 5 Drawing Sheets

(51) Int. Cl.
*H01G 4/30* (2006.01)
*H01G 4/008* (2006.01)
*H01G 4/12* (2006.01)

(56) References Cited

U.S. PATENT DOCUMENTS

| | | | | |
|---|---|---|---|---|
| 2007/0084032 A1* | 4/2007 | Mruz | ............... | H01G 2/065 |
| | | | | 29/25.03 |
| 2009/0310277 A1* | 12/2009 | Kayatani | ............ | H01G 4/005 |
| | | | | 361/306.3 |
| 2010/0123994 A1* | 5/2010 | Nishisaka | .......... | H01G 4/232 |
| | | | | 361/306.3 |
| 2011/0290542 A1* | 12/2011 | Nishisaka | .......... | H01G 4/232 |
| | | | | 174/257 |
| 2014/0185189 A1 | 7/2014 | Kim et al. | | |
| 2014/0367152 A1* | 12/2014 | Lee | ................. | H05K 1/111 |
| | | | | 174/260 |
| 2015/0016018 A1* | 1/2015 | Onishi | ............... | H01G 4/005 |
| | | | | 361/301.4 |
| 2015/0060121 A1* | 3/2015 | Lee | ................... | H05K 1/185 |
| | | | | 174/258 |
| 2016/0093437 A1* | 3/2016 | Itamura | ............. | H01G 4/12 |
| | | | | 361/301.4 |
| 2017/0290163 A1* | 10/2017 | Hirota | ............... | H05K 1/185 |
| 2018/0068793 A1 | 3/2018 | Lee et al. | | |

FOREIGN PATENT DOCUMENTS

| | | |
|---|---|---|
| JP | 2005-217126 A | 8/2005 |
| JP | 2012-009813 A | 1/2012 |
| JP | 2013-206898 A | 10/2013 |
| KR | 10-2014-0085097 A | 7/2014 |
| KR | 10-2015-0051421 A | 5/2015 |
| KR | 10-1539884 B1 | 7/2015 |
| KR | 10-2018-0028276 A | 3/2018 |

* cited by examiner

II-II'

MULTILAYER CERAMIC ELECTRONIC COMPONENT

CROSS-REFERENCE TO RELATED APPLICATION(S)

This application claims the benefit of priority to Korean Patent Application No. 10-2018-0117771 filed on Oct. 2, 2018 in the Korean Intellectual Property Office, the disclosure of which is incorporated herein by reference in its entirety.

BACKGROUND

1. Field

The present disclosure relates to a multilayer ceramic electronic component and more particularly, to a multilayer ceramic electronic component having improved reliability.

2. Description of Related Art

Recently, a substrate having high mounting density has been developed, and it has become necessary to reduce a mounting area of a multilayer ceramic capacitor. There has been increased demand for products in which a multilayer ceramic capacitor having a low thickness is embedded in a substrate or mounted in a lower end of an application processor as a land-side capacitor.

In this case, not only the mounting area may be decreased, but equivalent series inductance (ESL) occurring in a substrate may also be reduced. For this reason, a multilayer ceramic capacitor having a relatively low thickness has increasingly been used.

A multilayer ceramic capacitor having a low thickness may have, however, high brittleness and low strength against breakage.

The low strength against breakage may increase the possibility of breakage during measuring, selecting, and taping processes of a multilayer ceramic capacitor, and may increase breakage during a mounting process.

Thus, to commercially use a multilayer ceramic capacitor having a low thickness, it may be necessary to improve the strength against breakage of a multilayer ceramic capacitor having a low thickness.

To improve strength against breakage of a multilayer ceramic capacitor having a low thickness, there have been attempts to insert a metal layer into a body without affecting the implementation of electrical properties. However, the number of processes may be increased as the process of inserting a metal layer into a body, without affecting the implementation of electrical properties, has been added, and capacitance may be decreased due to the metal layer.

SUMMARY

An aspect of the present disclosure may provide a multilayer ceramic electronic component, and more particularly to provide a multilayer ceramic electronic component having improved reliability.

According to an aspect of the present disclosure, a multilayer ceramic electronic component includes a ceramic body including a dielectric layer, and a first internal electrode and a second internal electrode facing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other, and a first external electrode electrically connected to the first internal electrode, and a second external electrode electrically connected to the second internal electrode, disposed on an outer surface of the ceramic body. The first and second external electrodes comprise a first electrode layer including a conductive metal, a first plating layer disposed on the first electrode layer and including nickel (Ni), and a second plating layer disposed on the first plating layer and including tin (Sn). A ratio (t1/t2) is within a range from 1.0 to 9.0, where t1 is a thickness of the first plating layer including nickel (Ni), and t2 is a thickness of the second plating layer including tin (Sn).

According to another aspect of the present disclosure, a multilayer ceramic electronic component includes a ceramic body including a dielectric layer, and a first internal electrode and a second internal electrode facing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other, and a first external electrode electrically connected to the first internal electrode, and a second external electrode electrically connected to the second internal electrode, disposed on an outer surface of the ceramic body. The first and second external electrodes comprise a first electrode layer including a conductive metal, and a plating layer disposed on the first electrode layer and including copper (Cu). A ratio (t3/t4) is within a range from 1.0 to 9.0, where t3 is a thickness of the first plating layer, and t4 is a thickness of the plating layer including copper (Cu).

According to another aspect of the present disclosure, a multilayer ceramic electronic component includes: a ceramic body including a dielectric layer, and a first internal electrode and a second internal electrode facing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other; and a first external electrode electrically connected to the first internal electrode, and a second external electrode electrically connected to the second internal electrode, disposed on an outer surface of the ceramic body. The first and second external electrodes comprise a first electrode layer including a conductive metal, a first plating layer disposed on the first electrode layer and including nickel (Ni), and a second plating layer disposed on the first plating layer and including tin (Sn), the first plating layer covers the first electrode layer, and extends beyond the first electrode layer on the first and second surfaces of the ceramic body to be in direct contact with the ceramic body, the second plating layer covers the first plating layer, and extends beyond the first plating layer on the first and second surfaces of the ceramic body to be in direct contact with the ceramic body, a thickness of the first plating layer is greater than or equal to 5 μm, and a thickness of the second plating layer is greater than or equal to 1 μm, and a sum of the thicknesses of the first plating layer and the second plating layer is 10 μm or less.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
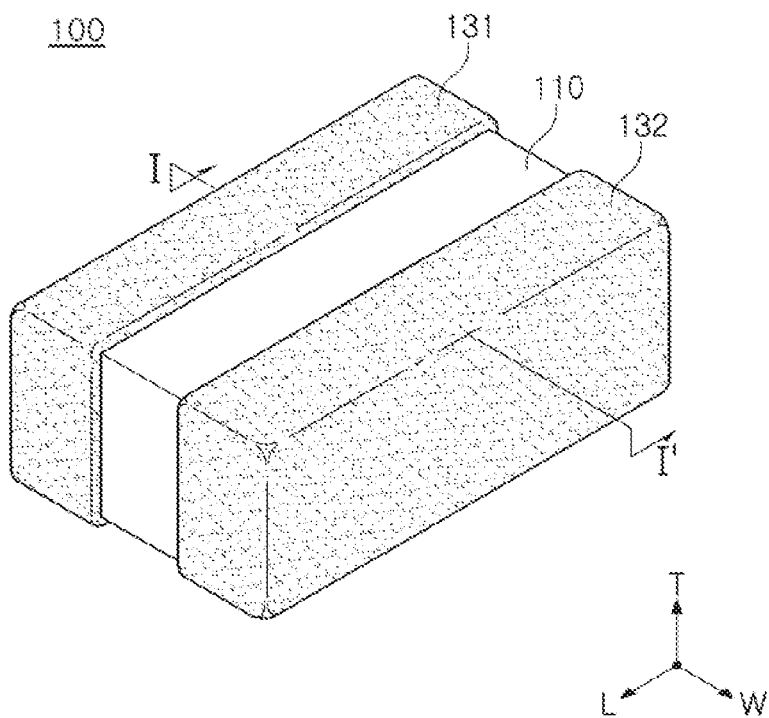
FIG. 1 is a perspective diagram illustrating a multilayer ceramic capacitor according to an exemplary embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are same elements in the drawings.

Further, throughout the specification, it will be understood that when a portion "includes" an element, it can further include another element, not excluding another element, unless otherwise indicated.

In the drawings, certain elements may be omitted to clearly describe the present disclosure, and to clearly express a plurality of layers and areas, thicknesses may be magnified. The same elements having the same function within the scope of the same concept will be described with use of the same reference numeral.

FIG. 1 is a perspective diagram illustrating a multilayer ceramic capacitor according to a first exemplary embodiment.

Figure 2:
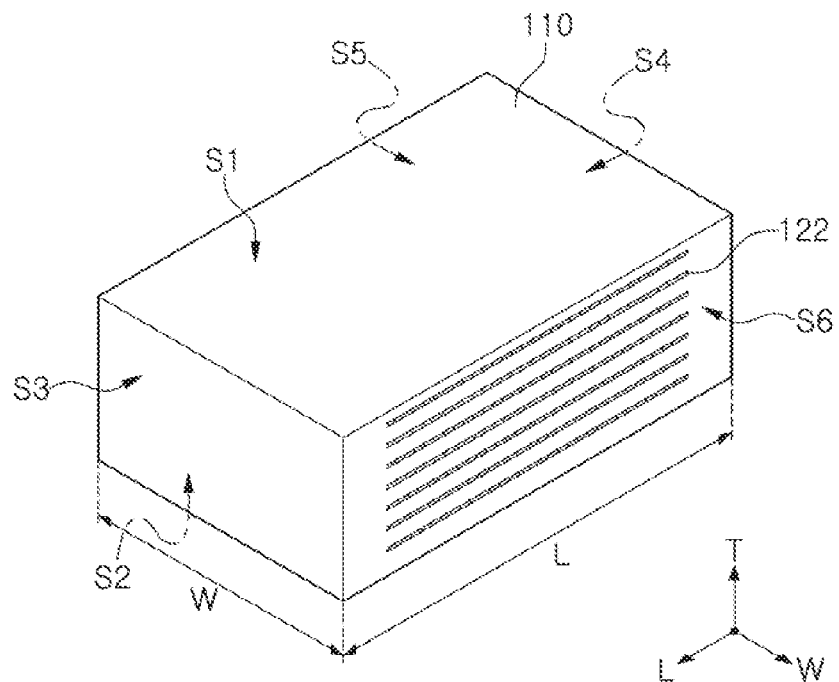
FIG. 2 is a diagram illustrating a ceramic body according to an exemplary embodiment in the present disclosure.

FIG. 2 is a diagram illustrating a ceramic body according to an exemplary embodiment.

Figure 3:
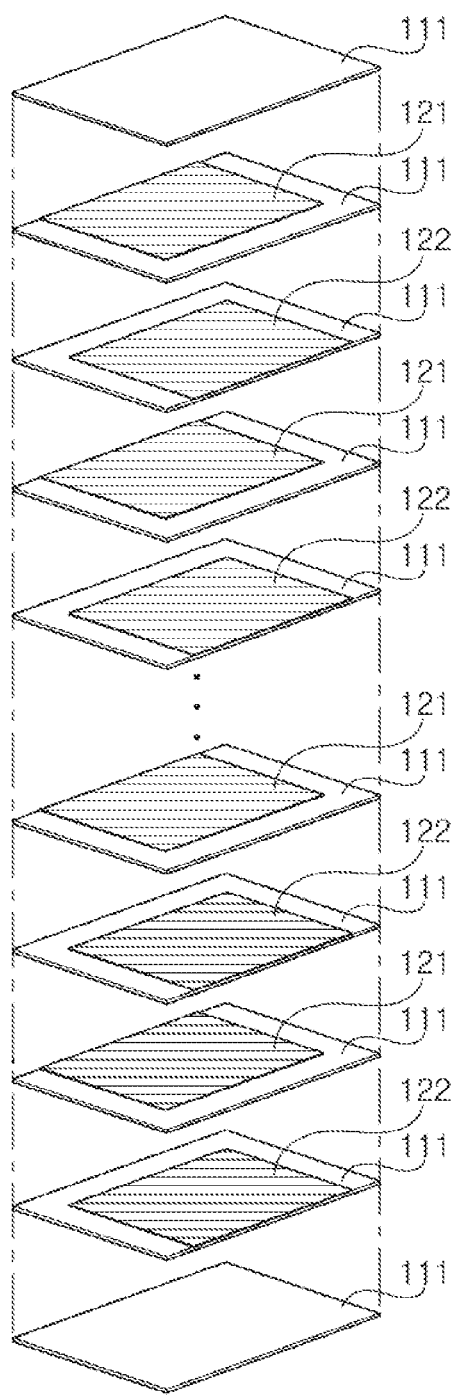
FIG. 3 is an exploded perspective diagram of FIG. 2.

FIG. 3 is an exploded perspective diagram of FIG. 2.

Figure 4:
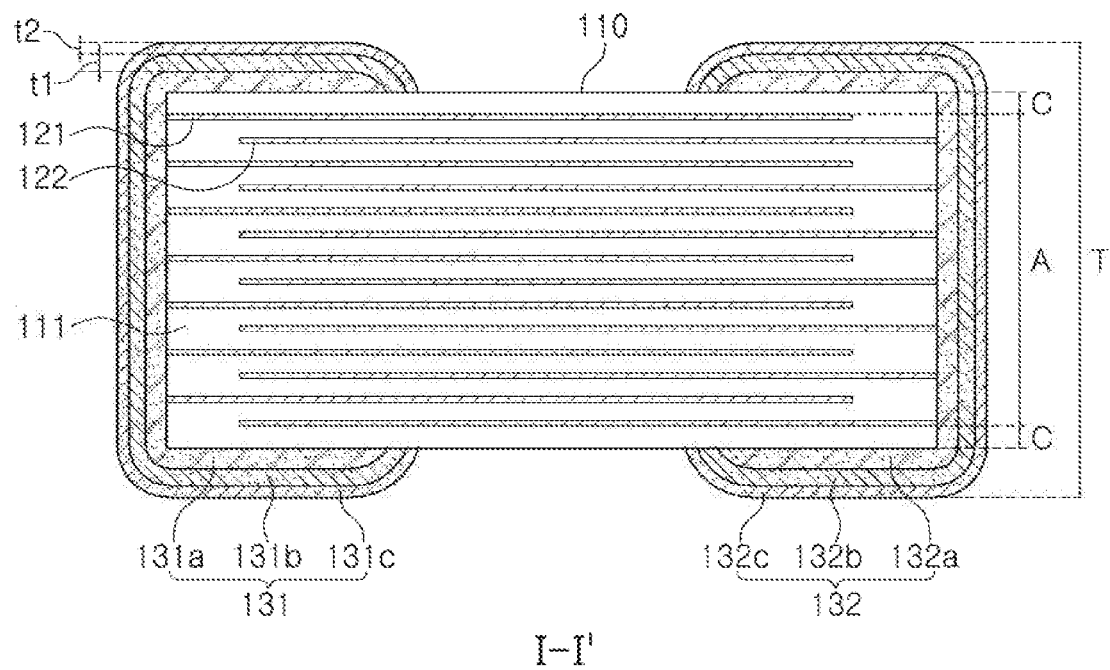
FIG. 4 is a cross-sectional diagram taken along line I-I' in FIG. 1 according to an exemplary embodiment in the present disclosure.

FIG. 4 is a cross-sectional diagram taken along line I-I' in FIG. 1 according to the present exemplary embodiment.

Referring to FIGS. 1 to 4, a multilayer ceramic electronic component according to an exemplary embodiment may include a ceramic body 110 including a dielectric layer 111, and a first internal electrode 121 and a second internal electrode 122 facing each other with the dielectric layer 111 interposed therebetween, and having first and second surfaces S1 and S2 opposing each other, third and fourth surfaces S3 and S4 connected to the first and second surfaces and opposing each other, and fifth and sixth surfaces S5 and S6 connected to the first to fourth surfaces and opposing each other, and a first external electrode 131 electrically connected to the first internal electrode 121, and a second external electrode 132 electrically connected to the second internal electrode 122, disposed in an external portion of the ceramic body 110. The first and second external electrodes 131 and 132 may include first electrode layers 131a and 132a including a conductive metal, first plating layers 131b and 132b disposed on the first electrode layers 131a and 132a and including nickel (Ni), and second plating layers 131c and 132c disposed on the first plating layers 131b and 132b and including tin (Sn).

In the description below, a multilayer ceramic electronic component according to an exemplary embodiment will be described, particularly a multilayer ceramic capacitor, but a multilayer ceramic electronic component is not limited thereto.

As for the multilayer ceramic capacitor according to an exemplary embodiment, a length direction may be defined as an "L" direction, a width direction may be defined as a "W" direction, and a thickness direction may be defined as a "T" direction. The thickness direction may be the same as a layering direction, a direction in which dielectric layers are layered.

In the exemplary embodiment, the ceramic body 110 may not be limited to any particular shape. As illustrated, the ceramic body 110 may have a hexagonal shape, for example.

The ceramic body 110 may have first and second surfaces S1 and S2 opposing each other, third and fourth surfaces S3 and S4 connecting to the first and second surfaces and opposing each other, and fifth and sixth surfaces S5 and S6 connected to the first to fourth surfaces and opposing each other.

The first and second surfaces S1 and S2 may face each other in a thickness direction of the ceramic body 110, the third and fourth surfaces S3 and S4 may face each other in a length direction, and the fifth and sixth surfaces S5 and S6 may face each other in a width direction.

One ends of the plurality of internal electrodes 121 and 122 disposed in the ceramic body 110 may be exposed to the fifth and sixth surfaces S5 and S6 of the ceramic body 110.

As for the internal electrodes 121 and 122, the first internal electrode 121 and the second internal electrode 122 having different polarities may be one pair.

One end of the first internal electrode 121 may be exposed to the fifth surface S5, and one end of the second internal electrode 122 may be exposed to the sixth surface S6.

The other ends of the first and second internal electrodes 121 and 122 may be formed from the sixth surface S6 or the fifth surface S5 with a certain gap therebetween. The configuration will be described in greater detail later.

The first and second external electrodes 131 and 132 may be formed on the fifth and sixth surfaces S5 and S6 of the ceramic body 110, and electrically connected to the internal electrodes.

According to the exemplary embodiment, a material of the dielectric layer 111 may not be limited to any particular material as long as sufficient capacitance can be obtained. For example, a material of the dielectric layer 111 may be a barium titanate ($BaTiO_3$) powder.

As the material of the dielectric layer 111, various ceramic additives, organic solvents, coupling agents, dispersing agents, and the like, may be added to a barium titanate (BaTiO3) powder, or the like, depending on an intended purpose.

The ceramic body 110 may have an active portion A, a portion contributing to form capacitance of the capacitor, and upper and lower cover portions C formed in upper and lower portions of the active portion A as upper and lower margin portions.

The active portion A may be formed by repeatedly layering a plurality of the first and second internal electrodes 121 and 122 with the dielectric layer 111 interposed therebetween.

The upper and lower cover portions C may have the same material and composition as those of the dielectric layer 111, but the upper and lower cover portions C may not include an internal electrode.

In other words, the upper and lower cover portions C may include a ceramic material, such as a barium titanate (BaTiO$_3$) ceramic material, for example.

The upper and lower cover portions C may be formed by disposing a single dielectric layer or layering two or more dielectric layers on upper and lower surfaces of the active portion A, and may prevent damage to an internal electrode caused by physical or chemical stress.

A material of the first and second internal electrodes 121 and 122 may not be limited to any particular material. The first and second internal electrodes 121 and 122 may be formed of a conductive paste including one or more of silver (Ag), lead (Pb), platinum (Pt), nickel (Ni), and copper (Cu).

The multilayer ceramic capacitor according to the exemplary embodiment may include the first external electrode 131 electrically connected to the first internal electrode 121 and the second external electrode 132 electrically connected to the second internal electrode 122.

The first and second external electrodes 131 and 132 may be electrically connected to the first and second internal electrodes 121 and 122 to form capacitance, and the second internal electrode 122 may be connected to a potential different from a potential of the first external electrode 131.

The first and second internal electrodes 121 and 122 may be disposed to oppose each other with the dielectric layer 111 interposed therebetween, and may be alternately exposed to the fifth and sixth surfaces S5 and S6 of the ceramic body 110 in a width direction.

As the first and second internal electrodes 121 and 122 are alternately exposed to the fifth and sixth surfaces S5 and S6 of the ceramic body 110 in a width direction, a reverse geometry capacitor (RGC) or a low inductance chip capacitor (LICC) may be implemented, which will be described later.

In a general multilayer ceramic electronic component, an external electrode may be disposed on surfaces opposing each other in a length direction of a ceramic body.

In this case, when an alternating current (AC) is applied to the external electrode, a large current loop may be formed as a current path is long, and an induced magnetic field may become large, which may lead to an increase in inductance.

To address the issue above, according to the exemplary embodiment, the first and second external electrodes 131 and 132 may be disposed on the fifth and sixth surfaces S5 and S6 of the ceramic body 110, opposing each other in a width direction, to reduce a current path.

In this case, as a gap between the first and second external electrodes 131 and 132 is small, a current path may be reduced, and a current loop may also be reduced, which may reduce inductance.

The first external electrode 131 may be disposed on the fifth and sixth surfaces S5 and S6 of the ceramic body 110 in width direction, and may be extended to the first and second surfaces S1 and S2 of the ceramic body 110 in a width direction.

According to the exemplary embodiment, the first and second external electrodes 131 and 132 disposed on the first and second surfaces S1 and S2 of the ceramic body 110 may occupy areas 50% or greater of the first and second surfaces S1 and S2 of the ceramic body 110, respectively.

The first and second external electrodes 131 and 132 may include the first electrode layers 131a and 132a disposed on an outer portion of the ceramic body 110 and including a conductive metal, the first plating layers 131b and 132b disposed on the first electrode layers 131a and 132a and including nickel (Ni), and the second plating layers 131c and 132c disposed on the first plating layers 131b and 132b and including tin (Sn).

Referring to FIG. 4, the plating layers may have two layers, and the plating layers may include the first plating layers 131b and 132b including nickel (Ni) and the second plating layers 131c and 132c disposed on the first plating layers 131b and 132b and including tin (Sn). However, an exemplary embodiment thereof is not limited thereto.

The first electrode layer 131a and 132a may include a conductive metal and glass.

To form capacitance, the first and second external electrodes 131 and 132 may be formed on the fifth and sixth surfaces S5 and S6 of the ceramic body 110 in a width direction, respectively, and the first electrode layers 131a and 132a included in the first and second external electrodes 131 and 132 may be electrically connected to the first and second internal electrodes 121 and 122.

The first electrode layers 131a and 132a may be formed of the same conductive material as a material of the first and second internal electrodes 121 and 122, but a material of the first electrode layers 131a and 132a is not limited thereto. The material of the first electrode layers 131a and 132a may include one or more conductive metals selected from a group comprising copper (Cu), silver (Ag), nickel (Ni), and alloys thereof, for example.

The first electrode layers 131a and 132a may be formed by applying a conductive paste made by adding glass frit to a powder of the conductive metal, and performing a sintering process.

In other words, the first electrode layers 131a and 132a may be a sintered electrode layer including a conductive metal and glass.

According to the exemplary embodiment, the first and second external electrodes 131 and 132 may include the first plating layers 131b and 132b disposed on the first electrode layers 131a and 132a and including nickel (Ni), and the second plating layers 131c and 132c disposed on the first plating layers 131b and 132b and including tin (Sn).

According to the exemplary embodiment, the multilayer ceramic capacitor may have a thickness of 110 µm or less.

A multilayer ceramic capacitor having a low thickness, a thickness of 110 µm or less, has been increasingly used. However, a multilayer ceramic capacitor having a low thickness, a thickness of 110 µm or less, may have high brittleness and low strength against breakage.

The low strength against breakage may increase the possibility of breakage during measuring, selecting, and taping processes of a multilayer ceramic capacitor, and may increase breakage during a mounting process.

To improve the low strength against breakage of multilayer ceramic capacitor having a low thickness, a thickness of 110 µm or less, according to the exemplary embodiment, a ratio between a thickness (t2) of the second plating layer including tin (Sn) and a thickness of the first plating layer including nickel (Ni) may be adjusted, thereby increasing the strength against breakage of multilayer ceramic capacitor having a low thickness.

According to the exemplary embodiment, a ratio (t1/t2) between a thickness (t2) of the second plating layer 131c and 132c including tin (Sn) and a thickness (t1) of the first plating layer 131b and 132b including nickel (Ni) may be adjusted to be within a range from 1.0 to 9.0, and strength against breakage of multilayer ceramic capacitor having a low thickness, a thickness of 110 μm or less, may be increased, thereby preventing degradation of reliability caused by breakage and cracks occurring during processes.

In other words, according to the exemplary embodiment, by forming a thickness of the first plating layer nickel (Ni) to be greater than a thickness of the second plating layer including tin (Sn), strength against breakage of multilayer ceramic capacitor having a low thickness, a thickness of 110 μm or less, may be increased.

In the prior art, a thickness of the first plating layer nickel (Ni) is not significantly different from a thickness of the second plating layer including tin (Sn). However, it may be necessary to secure a certain level of thicknesses of the plating layers as a thickness of a multilayer ceramic capacitor is reduced, and strength against breakage of multilayer ceramic capacitor is reduced in proportionate to the square of a thickness of the plating layer.

However, if a thickness of the plating layer is overly increased to enhance strength against breakage of a multilayer ceramic capacitor, an area occupied by an external electrode may be increased, and it may be difficult to implement a multilayer ceramic capacitor having high capacitance.

According to the exemplary embodiment, to enhance strength against breakage of a multilayer ceramic capacitor having a low thickness, a thickness of 110 μm or less, and to implement a multilayer ceramic capacitor high capacitance at the same time, a desired ratio between thicknesses of the first and second plating layers may be derived within a limited thickness of the plating layers.

According to the exemplary embodiment, a ratio (t1/t2) between a thickness (t2) of the second plating layer including tin (Sn) and a thickness (t1) of the first plating layer including nickel (Ni) may be determined. In the case of a multilayer ceramic capacitor having a thickness of 110 μm or greater, disclosed in the prior art, breakage and cracks may not occur during processes, and the ratio derived in the exemplary embodiment may not be applied to the multilayer ceramic capacitor.

When a ratio (t1/t2) between a thickness (t2) of the second plating layer including tin (Sn) and a thickness (t1) of the first plating layer including nickel (Ni) is less than 1.0, strength against breakage may not be significantly increased as compared to a thickness of an external electrode.

When a ratio (t1/t2) between a thickness (t2) of the second plating layer including tin (Sn) and a thickness (t1) of the first plating layer including nickel (Ni) exceeds 9.0, a ratio between a thickness of the ceramic body 110 and a thickness of an area occupied by an external electrode may be significantly high, and it may not be possible to implement a multilayer ceramic capacitor having high capacitance.

Accordingly to the exemplary embodiment, the sum of a thickness of the first plating layer 131b and 132b and a thickness of the second plating layer 131c and 132c may be 10 μm or less.

According to the exemplary embodiment, to enhance strength against breakage of a multilayer ceramic capacitor having a low thickness, a thickness of 110 μm or less, and to implement a multilayer ceramic capacitor high capacitance at the same time, a ratio (t1/t2) between a thickness (t2) of the second plating layer 131c and 132c including tin (Sn) and a thickness (t1) of the first plating layer 131b and 132b including nickel (Ni) may be within a range from 1.0 to 9.0, and the sum of a thickness of the first plating layer 131b and 132b and a thickness of the second plating layer 131c and 132c may be 10 μm or less.

If the sum of a thickness of the first plating layer 131b and 132b and a thickness of the second plating layer 131c and 132c exceeds 10 μm, a ratio between a thickness of the ceramic body 110 and a thickness of an area occupied by an external electrode may be significantly high, and it may not be possible to implement a multilayer ceramic capacitor having high capacitance.

Figure 5:
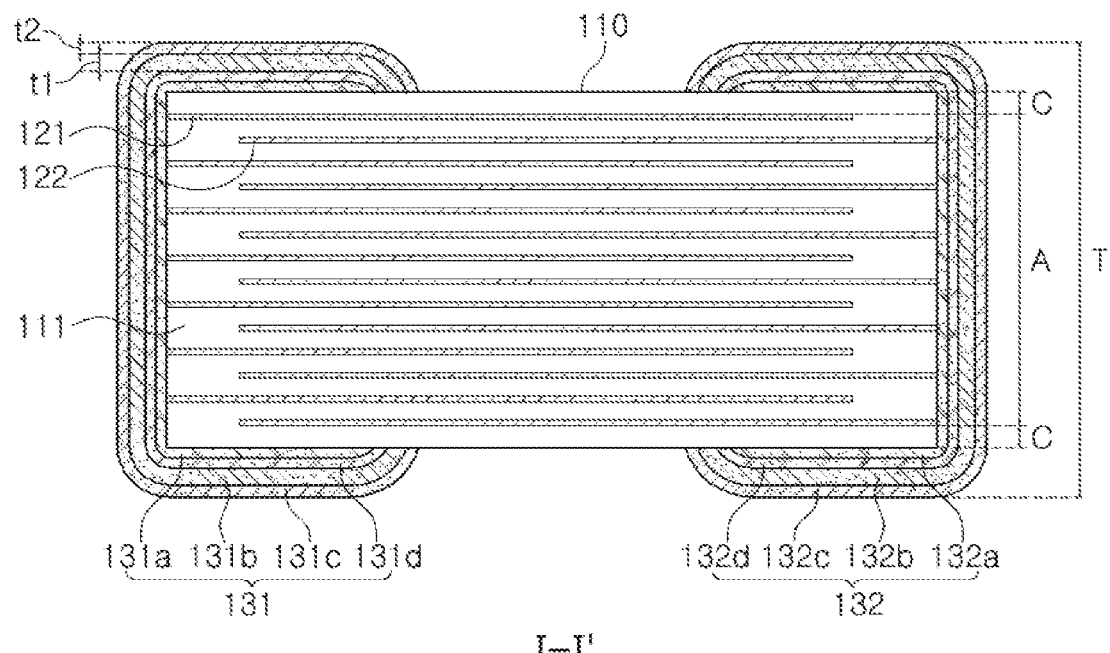
FIG. 5 is a cross-sectional diagram taken along line I-I' in FIG. 1 according to another exemplary embodiment in the present disclosure.

FIG. 5 is a cross-sectional diagram taken along line I-I' in FIG. 1 according to another exemplary embodiment.

As described above, plating layers may have two layers, and the plating layers may include first plating layers 131b and 132b and second plating layers 131c and 132c, respectively.

Referring to FIG. 5, in a multilayer ceramic capacitor according to the exemplary embodiment, first and second external electrodes 131 and 132 may further include a third plating layer 131d and 132d including copper (Cu) between first electrode layers 131a and 132a and the first plating layers 131b and 132b disposed on the first electrode layers 131a and 132a.

According to the exemplary embodiment, the first and second external electrodes 131 and 132 disposed on the first and second surfaces S1 and S2 of the ceramic body 110 may occupy areas 50% or greater of the first and second surfaces S1 and S2 of the ceramic body 110, respectively.

Figure 6:
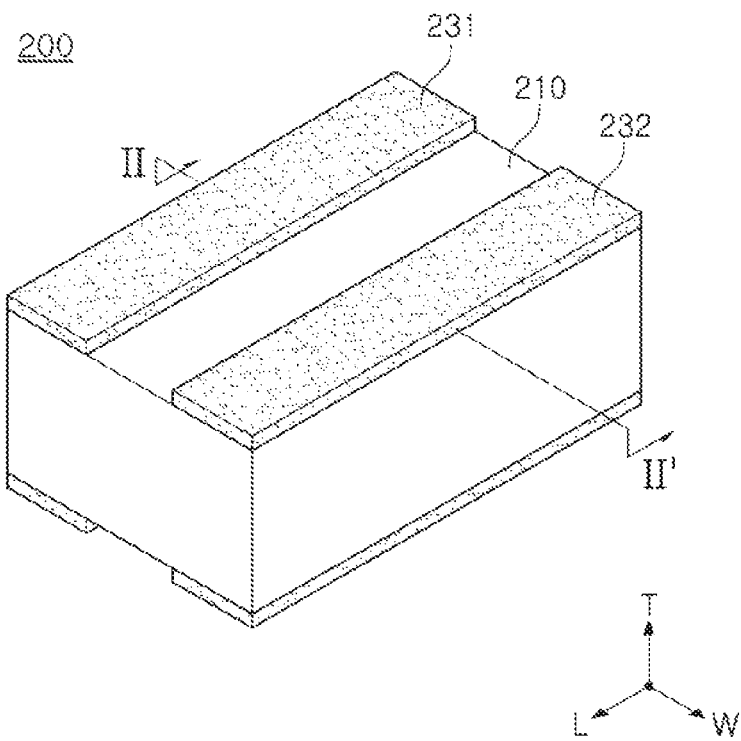
FIG. 6 is a perspective diagram illustrating a multilayer ceramic capacitor according to another exemplary embodiment in the present disclosure.

FIG. 6 is a perspective diagram illustrating a multilayer ceramic capacitor according to another exemplary embodiment.

Figure 7:
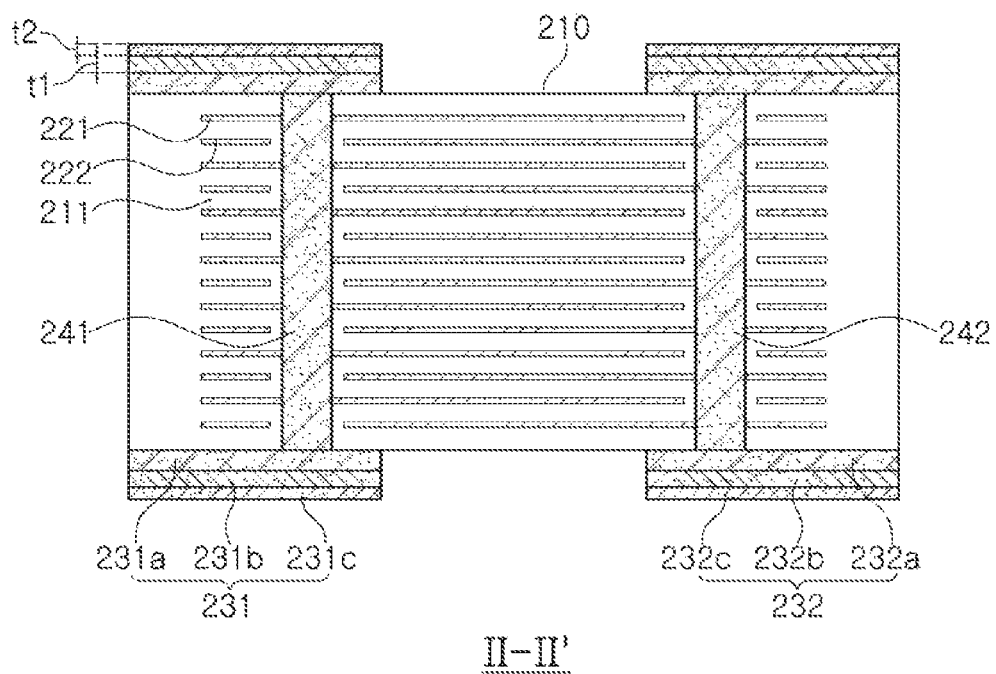
FIG. 7 is a cross-sectional diagram taken along line II-II' in FIG. 6 according to another exemplary embodiment in the present disclosure.

FIG. 7 is a cross-sectional diagram taken along line II-II' in FIG. 6 according to another exemplary embodiment.

Referring to FIGS. 6 and 7, as compared to the multilayer ceramic capacitor 100 in the exemplary embodiment described above, in a multilayer ceramic capacitor 200, first and second external electrodes 231 and 232 may be disposed on the first and second surfaces S1 and S2 of a ceramic body 210, respectively, and spaced part from each other. The first external electrodes 231 disposed on the first and second surfaces S1 and S2 may be connected to each other through a first via 241 penetrating through, and disposed in, the ceramic body 210, and the second external electrodes 232 disposed on the first and second surfaces may be connected to each other through a second via 242 penetrating through, and disposed in, the ceramic body 210.

The first external electrodes 231 may be disposed on the first and second surfaces S1 and S2 of the ceramic body 210.

The first external electrodes 231 disposed on the first and second surfaces S1 and S2 of the ceramic body 210 may be connected to each other through the first via 241 penetrating through, and disposed in, the ceramic body 210.

The second external electrodes 232 may be disposed on the first and second surfaces S1 and S2 of the ceramic body 110, and may be spaced apart from the first external electrode 231.

According to the exemplary embodiment, the first and second external electrodes 231 and 232 may be disposed on the first and second surfaces S1 and S2 of the ceramic body 210 in a length direction, and spaced part from each other. However, an exemplary embodiment thereof is not limited thereto. The first and second external electrodes 231 and 232 may be formed up to boundaries between the first and second surfaces S1 and S2 and the third and fourth surfaces S3 and S4 of the ceramic body 210, for example.

Also, the first and second external electrodes 231 and 232 may be disposed on the first and second surfaces S1 and S2 of the ceramic body 210, respectively, may be spaced apart from each other, and may face each other in a width direction.

The first via 241 may be connected to the first internal electrode 221, and may be insulated from the second internal electrode 222, and the second via 242 may be connected to the second internal electrode 222, and may be insulated from the first internal electrode 221.

The first external electrodes 231 disposed on the first and second surfaces S1 and S2 of the ceramic body 210 may be connected to each other through the first via 241 penetrating through, and disposed in, the ceramic body 210. As the first via 241 is connected to the first internal electrode 221, and insulated from the second internal electrode 222, the first external electrodes 231 may be electrically connected to the first internal electrode 221.

The second external electrodes 232 disposed on the first and second surfaces S1 and S2 of the ceramic body 210 may be connected to each other through the second via 242 penetrating through, and disposed in, the ceramic body 210. As the second via 242 is connected to the second internal electrode 222 and insulated from the first internal electrode 221, the second external electrode 232 may be electrically connected to the second internal electrode 222.

According to the exemplary embodiment, the first and second internal electrode 221 and 222 may not be exposed to a side surface of the ceramic body 210, and may be connected to the first and second external electrodes 231 and 232 through the first via 241 and the second via 242 penetrating through the ceramic body 210 in a thickness direction, respectively.

In the case of the multilayer ceramic capacitor according to the exemplary embodiment also, as the first and second external electrodes 231 and 232 are disposed on the first and second surfaces S1 and S2 of the ceramic body 210, respectively, and spaced apart from each other and face each other in a width direction, a reverse geometry capacitor (RGC) or a low inductance chip capacitor (LICC) may be implemented.

The first via 241 and the second via 242 may be formed by forming holes in the ceramic body 210 and the first and second internal electrodes 221 and 222, and filling the holes with a conductive material. The conductive material may be applied by applying a conductive paste, or through a plating process, and the like. The holes in the ceramic body 210 may be formed by performing a laser process or a punching process on a ceramic green sheet, or may be obtained by forming a hole on a layering body after a sintering process.

In the multilayer ceramic capacitor 200 according to the exemplary embodiment, the first and second internal electrodes 221 and 222 may be connected to the first and second external electrodes 231 and 232 through the first and second vias 241 and 242, respectively, and an area of overlap between the first and second internal electrodes 221 and 222 may be significantly increased.

Accordingly, without applying the method of increasing the number of internal electrode layers by reducing thicknesses of a dielectric layer and an internal electrode, and the like, it may be possible to increase capacitance of a capacitor. Also, as the same type of internal electrodes are electrically connected to each other through the first via 241 and the second via 242, even when a thickness of a multilayer ceramic capacitor is significantly low, a thickness of 110 μm less, for example, connectivity of internal electrodes may be improved.

According to the exemplary embodiment, the first and second external electrodes 231 and 232 may include first electrode layers 231a and 232a including a conductive metal, first plating layers 231b and 232b disposed on the first electrode layers 231a and 232a and including nickel (Ni), and second plating layers 231c and 232c disposed on the first plating layers 231b and 232b and including tin (Sn).

Also, by adjusting a ratio (t1/t2) between a thickness (t2) of the second plating layers 231c and 232c including tin (Sn) and a thickness (t1) of the first plating layers 231b and 232b including nickel (Ni) to be within a range from 1.0 to 9.0, strength against breakage of a multilayer ceramic capacitor having a low thickness, a thickness of 110 μm or less, may be increased, thereby preventing degradation of reliability caused by breakage and cracks occurring during processes.

The descriptions of the multilayer ceramic capacitor described in the aforementioned exemplary embodiment will not be repeated.

Figure 8:
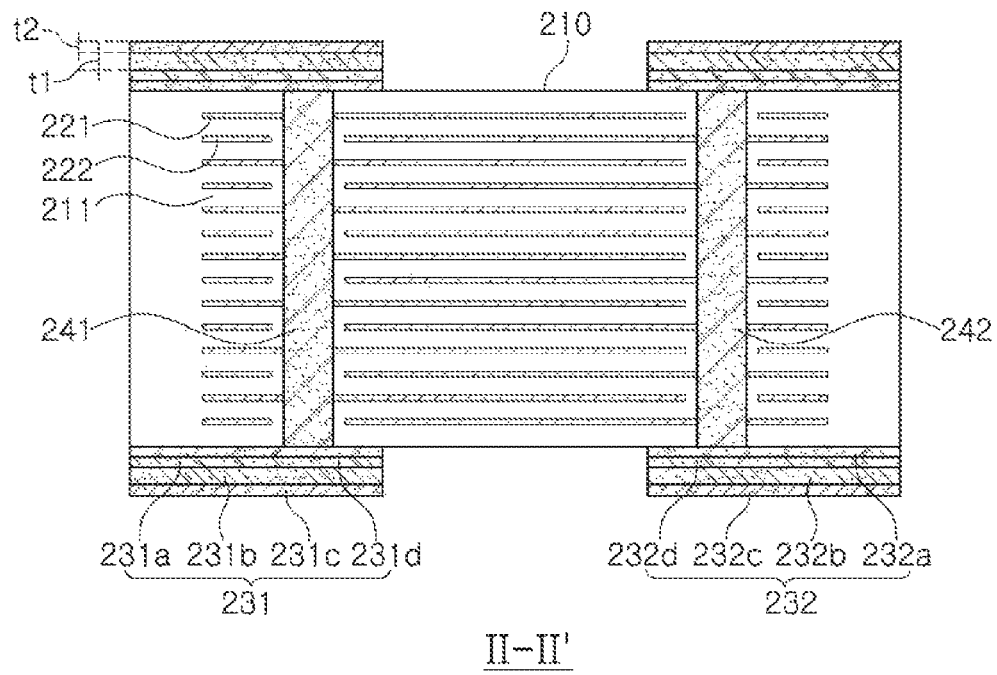
FIG. 8 is a cross-sectional diagram taken along line II-II' in FIG. 6 according to another exemplary embodiment in the present disclosure.

FIG. 8 is a cross-sectional diagram taken along line II-II' in FIG. 6 according to another exemplary embodiment.

According to the exemplary embodiment described above, the plating layers may have two layers, and the plating layers may include the first plating layers 231b and 232b and the second plating layers 231c and 232c.

Referring to FIG. 8, in a multilayer ceramic capacitor according to another exemplary embodiment, first and second external electrodes 231 and 232 may further include third plating layers 231d and 232d including copper (Cu) between the first electrode layers 231a and 232a and the first plating layers 131b and 132b disposed on the first electrode layers 231a and 232a.

According to the exemplary embodiments, the first and second external electrodes 231 and 232 disposed on the first and second surfaces S1 and S2 of the ceramic body 210 in a width direction may occupy areas 50% or greater of the first and second surfaces S1 and S2 of the ceramic body 210, respectively.

Figure 9:
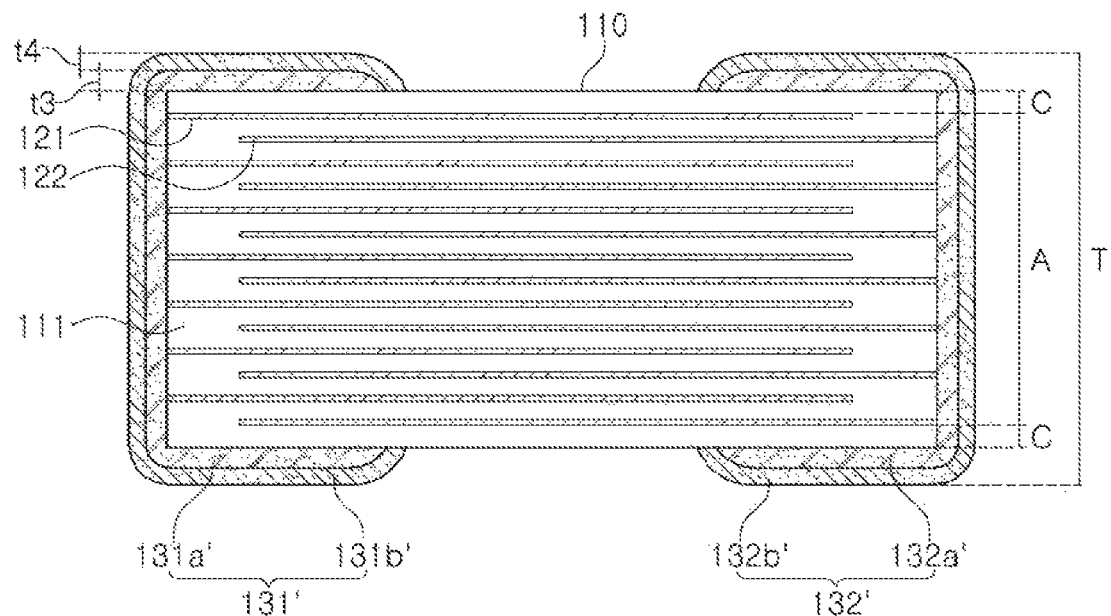
FIG. 9 is a cross-sectional diagram taken along line I-I' in FIG. 1 according to another exemplary embodiment in the present disclosure.

FIG. 9 is a cross-sectional diagram taken along line I-I' in FIG. 1 according to another exemplary embodiment.

Referring to FIG. 9, a multilayer ceramic electronic component according to an exemplary embodiment may include a ceramic body 110 including a dielectric layer 111, and a first internal electrode 121 and a second internal electrode 122 facing each other with the dielectric layer 111 interposed therebetween, and having first and second surfaces S1 and S2 opposing each other, third and fourth surfaces S3 and S4 connected to the first and second surfaces and opposing each other, and fifth and sixth surfaces S5 and S6 connected to the first to fourth surfaces and opposing each other, and a first external electrode 131' electrically connected to the first internal electrode 121, and a second external electrode 132' electrically connected to the second internal electrode 122, disposed in an external portion of the ceramic body 110. The first and second external electrodes 131' and 132' may include first electrode layers 131a' and 132a' including a conductive metal, plating layers 131b' and 132b' disposed on the first electrode layers 131a' and 132a' and including copper (Cu). A ratio (t3/t4) between a thickness (t4) of the plating layer 131b' and 132b' including copper (Cu) and a thickness (t3) of the first plating layer 131a' and 132a' is within a range from 1.0 to 9.0.

As the first and second external electrodes 131' and 132' include the plating layers 131b' and 132b' including copper (Cu) on the first electrode layers 131a' and 132a' including a conductive metal in the exemplary embodiment, the multilayer ceramic capacitor according to the exemplary embodiment may be used as a multilayer ceramic capacitor mounted in a substrate.

According to the exemplary embodiment, as the first and second external electrodes 131' and 132' include the plating layers 131b' and 132b' including copper (Cu) on outer potions thereof, electrical connectivity with copper (Cu), a material of a via in a substrate, may be improved.

In other words, the multilayer ceramic capacitor 100 according to the exemplary embodiment may not be mounted on a substrate as the multilayer ceramic capacitor 100 is for being mounted on a printed circuit board, and the plating layers 131b' and 132b' including copper (Cu) of the multilayer ceramic capacitor are electrically connected through the via formed by copper (Cu) in the substrate. Thus, electrical connectivity with copper (Cu), a material of the via in a substrate, may be improved.

According to the exemplary embodiment, the first and second external electrodes 131' and 132' disposed on the first and second surfaces S1 and S2 of the ceramic body 110 may occupy areas 50% or greater of the first and second surfaces S1 and S2 of the ceramic body 110, respectively.

The first electrode layers 131a' and 132a' may be formed of the same conductive material as a material of the first and second internal electrodes 121 and 122, but a material of the first electrode layers 131a and 132a is not limited thereto. The material of the first electrode layers 131a' and 132a' may include one or more conductive metals selected from a group comprising copper (Cu), silver (Ag), nickel (Ni), and alloys thereof, for example.

In the description below, a method of manufacturing of a multilayer ceramic capacitor will be described in accordance with an exemplary embodiment. The method, however, is not limited thereto.

As for the method of manufacturing a multilayer ceramic capacitor according to the exemplary embodiment, a slurry formed including a powder such as barium titanate (BaTiO$_3$), and the like, may be applied on a carrier film and dried to form a plurality of ceramic green sheets, and a dielectric layer may be formed using the ceramic green sheets.

The ceramic green sheet may be a sheet having a certain thickness (μm), which may be manufactured using a slurry formed from a mixture of a ceramic powder, a binder, and a solvent, and by performing a doctor blade process on the slurry.

Then, a conductive paste for an internal electrode, having an average size of a nickel particle between 0.1 and 0.2 μm and including a nickel powder within a range from 40 to 50 part by weight, may be prepared.

An internal electrode may be formed by applying the conductive paste for an internal electrode on the green sheet using a printing process, the green sheets on which an internal electrode pattern is disposed may be layered, and the ceramic body 110 may be formed.

Thereafter, a first electrode layer including a conductive metal and glass may be formed on an outer portion of the ceramic body.

The conductive material may not be particularly limited. The conductive material may include, for example, one or more conductive metals selected from a group comprised of copper (Cu), silver (Ag), nickel (Ni), and alloys thereof.

In the exemplary embodiment, the first electrode layer may be formed using nickel (Ni) as the conductive metal.

The glass may not be particularly limited. The glass may have the same composition as that of the glass used for manufacturing an external electrode of a general multilayer ceramic capacitor.

The first electrode layer may be formed on upper and lower surfaces and ends of the ceramic body, and may be electrically connected to the first and second internal electrodes.

The first electrode layer may include 5% or higher of glass in volume, as compared to a first conductive metal.

Then, the first plating layer including nickel (Ni) may be formed on the first electrode layer.

Thereafter, the second electrode layer including tin (Sn) may be formed on the first plating layer.

Table 1 below shows a chip strength (N) in accordance with a ratio between thicknesses of first and second plating layers included in an external electrode.

A sample in which a value of the chip strength (N) measured in accordance with a ratio between thicknesses of the first and second plating layers included in an external electrode was less than 1.70 N, the chip strength was considered low, and the sample was selected as a comparative example.

TABLE 1

| Sample | Thickness of first plating layer including nickel (Ni) [μm] | Thickness of second plating layer including tin (Sn) [μm] | Ratio between thicknesses of first and second plating layers | Chip strength (N) |
|---|---|---|---|---|
| *1 | 1 | 9 | 0.11 | 1.13 |
| *2 | 2 | 8 | 0.25 | 1.25 |
| *3 | 3 | 7 | 0.42 | 1.36 |
| *4 | 4 | 6 | 0.66 | 1.48 |
| 5 | 5 | 5 | 1.00 | 1.79 |
| 6 | 6 | 4 | 1.50 | 1.95 |
| 7 | 7 | 3 | 2.33 | 2.16 |
| 8 | 8 | 2 | 4.00 | 2.41 |
| 9 | 9 | 1 | 9.00 | 2.72 |
| *10 | 10 | 1 | 10.00 | — |

*Comparative example

In table 1, a ratio (t1/t2) between a thickness t2 of the second plating layer 131c and 132c including tin (Sn) and a thickness t1 of the first plating layer 131b and 132b including nickel (Ni) was less than 1.0, and strength against breakage was low as compared to a thickness of the external electrode. As a result, the strength against breakage was not significantly increased.

In samples 5 to 9, a ratio (t1/t2) between a thickness t2 of the second plating layer 131c and 132c including tin (Sn) and a thickness t1 of the first plating layer 131b and 132b including nickel (Ni) was within a range from 1.0 to 9.0 as in the exemplary embodiments, and strength against breakage of a multilayer ceramic capacitor having a low thickness, a thickness of 110 μm or less, was increased. As a result, degradation of reliability caused by breakage and cracks occurring during processes may be prevented.

In sample 10, a ratio (t1/t2) between a thickness t2 of the second plating layer 131c and 132c including tin (Sn) and a thickness t1 of the first plating layer 131b and 132b including nickel (Ni) exceeded 9.0, and a ratio between a thickness of the ceramic body 110 and a thickness of an area occupied by the external electrode was significantly high. As a result, it was not possible to implement a multilayer ceramic capacitor having high capacitance.

According to the aforementioned exemplary embodiment, by adjusting a ratio between a thickness of the second plating layer including tin and a thickness of the first plating layer including nickel, strength against breakage of a multilayer ceramic capacitor having a low thickness may be increased, and degradation of reliability caused by breakage and cracks occurring during processes may be prevented.

While the exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
    a ceramic body including a dielectric layer, and a first internal electrode and a second internal electrode facing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other; and
    a first external electrode electrically connected to the first internal electrode, and a second external electrode electrically connected to the second internal electrode, disposed on an outer surface of the ceramic body,
    wherein the first and second external electrodes each comprise a first electrode layer including a conductive metal, a first plating layer disposed on the first electrode layer and including nickel (Ni), a second plating layer disposed on the first plating layer and including tin (Sn), and a third plating layer including copper (Cu) disposed between the first electrode layer and the first plating layer, and
    wherein, in each of first and second external electrodes, a thickness t1 of the first plating layer including nickel (Ni) is greater than a thickness t2 of the second plating layer including tin (Sn), a thickness of the first electrode layer is greater than a total thickness of all plating layers, including the third plating layer disposed on the first electrode layer, and the third plating layer including copper (Cu) is spaced apart from the ceramic body by the first electrode layer such that a side surface of the first electrode layer, connecting a first surface of the first electrode layer disposed on the ceramic body to a second surface having the third plating layer disposed thereon, is devoid of the third plating layer thereon.

2. The multilayer ceramic electronic component of claim 1, wherein a sum of the thicknesses of the first plating layer and the second plating layer is 10 μm or less, and
    the thickness t1 of the first plating layer including nickel (Ni) is less than nine times the thickness t2 of the second plating layer including tin (Sn).

3. The multilayer ceramic electronic component of claim 1, wherein the first electrode layer is a sintered electrode layer including glass and at least one conductive metal selected from a group comprising copper (Cu), silver (Ag), nickel (Ni), and alloys thereof.

4. The multilayer ceramic electronic component of claim 3, wherein the first electrode layer includes nickel (Ni).

5. The multilayer ceramic electronic component of claim 1, wherein the multilayer ceramic electronic component has a thickness of 110 μm or less.

6. The multilayer ceramic electronic component of claim 1, wherein the first and second external electrodes each include portions disposed on the first and second surfaces of the ceramic body, respectively, and spaced apart from each other, a portion of the first external electrode disposed on the first surface is connected to another portion of the first external electrode disposed on the second surface through a first via penetrating through, and disposed in, the ceramic body, and a portion of the second external electrode disposed on the first surface is connected to another portion of the second external electrode disposed on the second surface through a second via penetrating through, and disposed in, the ceramic body.

7. The multilayer ceramic electronic component of claim 6, wherein the first via is connected to the first internal electrode and is insulated from the second internal electrode, and the second via is connected to the second internal electrode and is insulated from the first internal electrode.

8. The multilayer ceramic electronic component of claim 6, wherein the first and second external electrodes disposed on the first and second surfaces of the ceramic body occupy areas 50% or greater of the first and second surfaces of the ceramic body, respectively.

9. The multilayer ceramic electronic component of claim 1, wherein the first and second external electrodes disposed on the first and second surfaces of the ceramic body occupy areas 50% or greater of the first and second surfaces of the ceramic body, respectively.

10. A multilayer ceramic electronic component comprising:
    a ceramic body including a dielectric layer, and a first internal electrode and a second internal electrode facing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other; and
    a first external electrode electrically connected to the first internal electrode, and a second external electrode electrically connected to the second internal electrode, disposed on an outer surface of the ceramic body,
    wherein the first and second external electrodes each comprise a first electrode layer including a conductive metal, and a plating layer disposed on the first electrode layer and including copper (Cu), and
    wherein a thickness t3 of the first electrode layer is greater than a total thickness t4 of all plating layers, including the plating layer disposed on the first electrode layer, and the plating layer including copper (Cu) is spaced apart from the ceramic body by the first electrode layer such that a side surface of the first electrode layer, connecting a first surface of the first electrode layer disposed on the ceramic body to a second surface having the plating layer disposed thereon, is devoid of the plating layer including copper (Cu) thereon.

11. The multilayer ceramic electronic component of claim 10, wherein the first electrode layer is a sintered electrode layer including glass and at least one conductive metal selected from a group comprising copper (Cu), silver (Ag), nickel (Ni), and alloys thereof.

12. The multilayer ceramic electronic component of claim 11, wherein the first electrode layer includes nickel (Ni).

13. The multilayer ceramic electronic component of claim 10, wherein the first and second external electrodes disposed on the first and second surfaces of the ceramic body occupy areas 50% or greater of the first and second surfaces of the ceramic body, respectively.

14. A multilayer ceramic electronic component comprising:
- a ceramic body including a dielectric layer, and a first internal electrode and a second internal electrode facing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other; and
- a first external electrode electrically connected to the first internal electrode, and a second external electrode electrically connected to the second internal electrode, disposed on an outer surface of the ceramic body,
- wherein the first and second external electrodes each comprise a first electrode layer including a conductive metal, a first plating layer disposed on the first electrode layer and including nickel (Ni), a second plating layer disposed on the first plating layer and including tin (Sn), and a third plating layer including copper (Cu) disposed between the first electrode layer and the first plating layer,
- wherein the first plating layer covers only a second surface of the first electrode layer, from among the second surface of the first electrode layer opposing a first surface of the first electrode layer disposed on the ceramic body and side surfaces of the first electrode layer connecting the first and second surfaces of the first electrode layer,
- wherein the second plating layer covers only a second surface of the first plating layer, from among the second surface of the first plating layer opposing a first surface of the first plating layer facing the ceramic body and side surfaces of the first plating layer connecting the first and second surfaces of the first plating layer,
- wherein a thickness of the first plating layer is greater than a thickness of the second plating layer, the thickness of the first plating layer is greater than or equal to 5 μm, the thickness of the second plating layer is greater than or equal to 1 μm, and a sum of the thicknesses of the first plating layer and the second plating layer is 10 μm or less, and
- wherein a thickness of the first electrode layer is greater than a total thickness of all plating layers, including the third plating layer disposed on the first electrode layer, and the third plating layer including copper (Cu) is spaced apart from the ceramic body by the first electrode layer such that a side surface of the first electrode layer, connecting a first surface of the first electrode layer disposed on the ceramic body to a second surface of the first electrode layer having the third plating layer disposed thereon, is devoid of the third plating layer thereon.

15. The multilayer ceramic electronic component of claim 14, wherein the first electrode layer is a sintered electrode layer including glass and at least one conductive metal selected from a group comprising copper (Cu), silver (Ag), nickel (Ni), and alloys thereof.

16. The multilayer ceramic electronic component of claim 14, wherein the first and second external electrodes disposed on the first and second surfaces of the ceramic body occupy areas 50% or greater of the first and second surfaces of the ceramic body, respectively.

17. The multilayer ceramic electronic component of claim 14, wherein the multilayer ceramic electronic component has a thickness of 110 μm or less.

* * * * *